(12) United States Patent
Maus

(10) Patent No.: US 7,802,829 B2
(45) Date of Patent: Sep. 28, 2010

(54) TRAILER MOUNTED CRASH ATTENUATOR

(75) Inventor: Geoffrey B. Maus, Mission Viejo, CA (US)

(73) Assignee: TrafFix Devices, Inc., San Clemente (*) Notice: Subject to any disclaimer, the term of this patent is extended or adjusted under 35 U.S.C. 154(b) by 216 days.

(21) Appl. No.: 12/023,013

(22) Filed: Jan. 30, 2008

(65) Prior Publication Data

US 2008/0179901 A1   Jul. 31, 2008

Related U.S. Application Data

(60) Provisional application No. 60/898,487, filed on Jan. 30, 2007.

(51) Int. Cl.
*B60R 19/24* (2006.01)
*E01F 15/00* (2006.01)

(52) U.S. Cl. .................. 293/133; 293/132; 404/10

(58) Field of Classification Search .......... 293/132, 293/133; 267/116, 120, 139; 188/377; 404/10
See application file for complete search history.

(56) References Cited

U.S. PATENT DOCUMENTS

| | | | |
|---|---|---|---|
| 4,352,484 A | 10/1982 | Gertz et al. | |
| 4,537,374 A | 8/1985 | Barnoin et al. | |
| 4,635,981 A | 1/1987 | Friton | |
| 4,658,941 A | 4/1987 | Gottwald et al. | |
| 4,711,481 A | 12/1987 | Krage et al. | |
| 4,770,420 A | 9/1988 | Gottwald et al. | |
| 4,823,923 A * | 4/1989 | Moyer | 188/376 |
| 5,052,732 A | 10/1991 | Oplet et al. | |
| 5,199,755 A | 4/1993 | Gertz | |
| 5,248,129 A | 9/1993 | Gertz | |
| 5,403,112 A | 4/1995 | Carney, III | |
| 5,403,113 A | 4/1995 | Gertz et al. | |

(Continued)

FOREIGN PATENT DOCUMENTS

WO   WO9405527 A1   9/1993

(Continued)

OTHER PUBLICATIONS

PCT Search Report and Written Opinion; PCT Application No. PCT/US08/52538, Jan. 30, 2008.

*Primary Examiner*—Patricia L Engle
(74) *Attorney, Agent, or Firm*—Stout, Uxa, Buyan & Mullins, LLP; Donald E. Stout

(57) ABSTRACT

A trailer-mounted crash impact attenuator is disclosed for attachment to a host vehicle, which comprises an anti-rotational attachment system having an internal support tube and a plurality of external support tubes. The internal support tube has a connector on its front end for attachment to a suitable receptacle on the host vehicle, and the plurality of external support tubes each have an anti-rotation support pad on a their front ends. At least one of the internal support tube and the plurality of external support tubes is comprised of a telescoping construction. A backup frame is disposed on a rear end of the attachment system, and a crash attenuator unit is disposed on an axle and pair of wheels for mobility. When the crash attenuator is impacted by an errant vehicle, the anti-rotational attachment system is actuated to prevent the trailer mounted crash impact attenuator from rotating relative to the host vehicle.

11 Claims, 5 Drawing Sheets

U.S. PATENT DOCUMENTS

| | | | |
|---|---|---|---|
| 5,642,792 A | 7/1997 | June | |
| 5,823,584 A | 10/1998 | Carney, III | |
| 5,947,452 A | 9/1999 | Albritton | |
| 6,092,959 A | 7/2000 | Leonhardt et al. | |
| 6,098,767 A | 8/2000 | Unrath | |
| 6,186,565 B1 | 2/2001 | Unrath | |
| 6,264,258 B1 * | 7/2001 | Li et al. | 293/102 |
| 6,364,400 B1 | 4/2002 | Unrath | |
| 6,481,920 B1 | 11/2002 | Leonhardt et al. | |
| 6,579,034 B1 | 6/2003 | Welch et al. | |
| 6,581,992 B1 | 6/2003 | Gertz et al. | |
| 6,619,491 B2 | 9/2003 | Payne et al. | |
| 6,866,284 B2 * | 3/2005 | Carlsson | 280/474 |
| 6,905,282 B2 | 6/2005 | Leonhardt et al. | |
| 6,962,324 B2 | 11/2005 | Bunn et al. | |
| 7,125,198 B2 | 10/2006 | Schiefferly et al. | |
| 7,143,877 B2 | 12/2006 | Dusserre-Telmon et al. | |
| 7,341,397 B2 * | 3/2008 | Murphy | 404/6 |
| 7,441,817 B1 | 10/2008 | Unrath, Sr. | |
| 7,604,268 B2 | 10/2009 | Unrath, Sr. | |
| 2004/0120760 A1 | 6/2004 | Carlsson | |
| 2006/0151971 A1 | 7/2006 | Buehler et al. | |
| 2006/0151986 A1 | 7/2006 | Reid et al. | |
| 2006/0170228 A1 | 8/2006 | Carlsson | |
| 2007/0187201 A1 | 8/2007 | Carlsson | |
| 2008/0175661 A1 | 7/2008 | Dyke et al. | |
| 2008/0179901 A1 | 7/2008 | Maus | |
| 2008/0258362 A1 | 10/2008 | Unrath | |
| 2008/0286042 A1 | 11/2008 | Dyke et al. | |

FOREIGN PATENT DOCUMENTS

| | | |
|---|---|---|
| WO | WO0187671 A1 | 11/2001 |

* cited by examiner

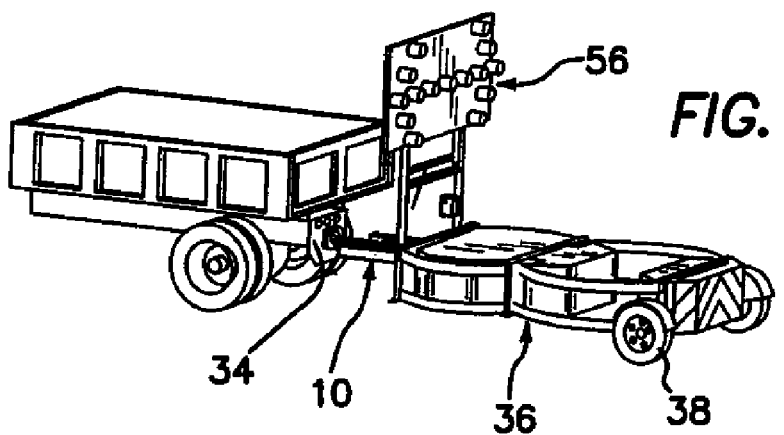
FIG. 13
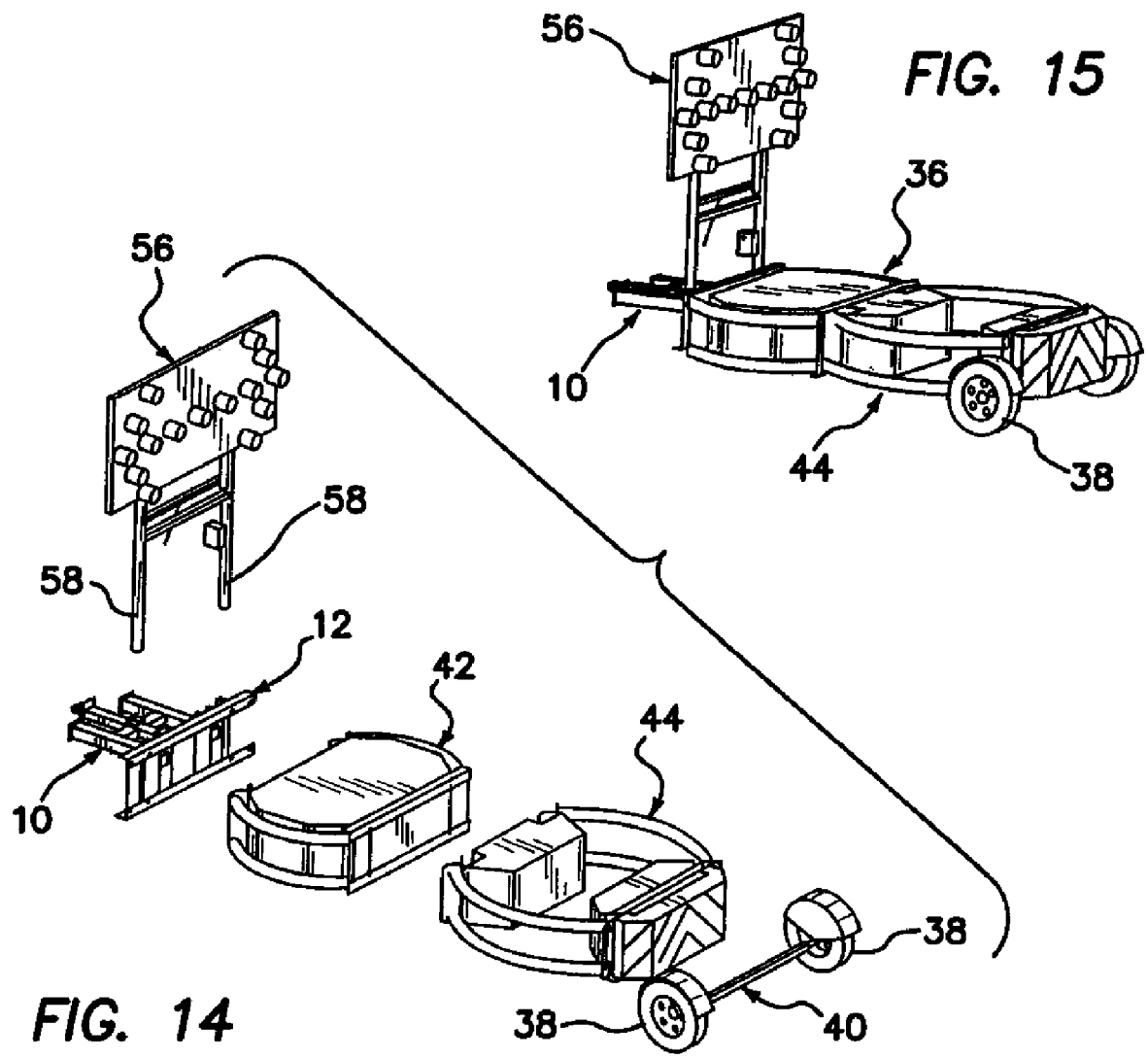
FIG. 15
FIG. 14

TRAILER MOUNTED CRASH ATTENUATOR

This application claims the benefit under 35 U.S.C. 119(e) of the filing date of Provisional U.S. Application Ser. No. 60/898,487, entitled Trailer Mounted Attenuator Telescoping Anti-Rotation System and filed on Jan. 30, 2007, which application is commonly assigned herewith and herein expressly incorporated herein by reference, in its entirety.

BACKGROUND OF THE INVENTION

1. Field of the Invention

This invention relates to attenuators which are particularly adapted for the absorption of energy in the event of an impact between an errant vehicle and a second, typically stationary or slow-moving vehicle, in the hope of minimizing injury to the occupants of both vehicles, and, more specifically, to trailer-mounted crash attenuators.

2. Description of the Related Art

Truck mounted attenuators (TMA's) have been in use for many years. TMA's typically comprise a fixed backup mounted to a dump truck or other vehicle and an energy absorbing cartridge attached to the fixed backup. In some TMA's, the cartridge is attached to the fixed backup via a hinge to allow for rotation of the cartridge to a vertical orientation for transport. The TMA cartridge absorbs the impact of an errant vehicle that collides with it, thereby protecting the truck, the vehicle, and the occupants of both.

One important purpose for the TMA's deployed on trucks and other vehicles, typically those used in highway construction, is for protecting workers in those vehicles. The trucks equipped with TMA's are referred to as shadow vehicles, barrier vehicles, and advance warning vehicles. Shadow vehicles are moving trucks that effectively block errant vehicles in the flow of traffic from striking the workers directly ahead of the truck. The protected workers typically perform mobile activities, such as crack pouring, patching utility work, striping, coning, pavement repair, pavement marking, and delineator repair, and the shadow vehicle moves with and behind the workers. Barrier vehicles are effectively used to protect vehicles in the flow of traffic from a hazardous situation, such as blocking open excavations. The barrier vehicles may be unoccupied. Advance warning vehicles may be used to warn the drivers in the flow of traffic of an upcoming moving or stationary situation. An example of an advance warning vehicle is a truck in a lane of a highway displaying an arrow indicating that the lane is closed ahead and that vehicles in the lane need to start to merge into another lane.

Under current federal highway safety regulations, all TMA's used on the National Highway System must be tested and approved based on one of three test levels: 25 mph TL-1, 45 mph TL-2, and 62.5 mph TL-3. If a TMA is tested and approved for the higher test speeds, it is automatically approved for all lower speed levels. To obtain product approval two mandatory tests are required. The differences between the two tests are that one test requires the use of an 1800 lb impact vehicle and the other test requires the use of a 4400 lb impact vehicle. The requirement to pass the tests is to collect two data points which record the forces exerted on the occupant in the impacting vehicle. The first data point is to record the force the occupant receives during the impact event, which must not exceed 20 G. This is defined as being the equivalent as 20 times a persons weight exerted on the occupant during the impact event. The second data point is occupant velocity, which is the forward head speed at which the impacting vehicle's occupant moves forward during the impact event and comes into contact with the steering wheel. The survival threshold value has been found to be 12 m/s (26.84 mph), so at no time during the impact event can the occupant velocity exceed the survival threshold of 12 m/s.

Mobile Impact Truck Attached Attenuators (MITAA) such as the Scorpion® TMA, available from the present assignee, TrafFix Devices, Inc., are attached directly to the truck frame. U.S. Pat. No. 6,581,992, which is co-assigned with the present application to TrafFix DEvices, Inc., describes the SCORPION TMA, and the '992 patent is herein expressly incorporated by reference, in its entirety. Attaching the impact attenuator to the truck frame provides the strongest point to support a 2000 LB attenuator and the large forces that occur during an impact event. Attaching directly to the truck frame also requires skilled labor such as welders and machinists, and can typically take up to three days to complete the assembly and install the more complicated attenuators on the market today. The demand for a greater cost effective method of installation and ease of attachment has been identified by TMA manufacturers. As a result, TMA manufacturers have developed a line of Mobile Impact Truck Attached Attenuators (MITAA) which attach directly to a truck's pintle hook, rather than the frame.

The challenge of attaching an attenuator to the pintle hook is to prevent the attenuator from undergoing an angular rotation during an impact event. Attaching the attenuator to the pintle hook alone does not prevent the attenuator from rotating during the impact event. Prior art products of this type, having a single attachment to the vehicle to the pintle hook alone, have been found, in crash testing, to provide no support for angular rotation, and to thus allow the attenuator to rotate about the pintle hook attachment during the impact. Such a uni-connection approach has thus been found to only be effective, and function properly, during a direct center line impact. Unacceptable angular rotation occurs during any angled or offset impact.

To prevent the angular rotation about the pintle hook when using a uni-connection, various manufacturers have developed additional supports in combination with the pintle hook connection. One such example is a so-called tri-support system, which utilizes two outboard supports in addition to the pintle hook support. These outboard supports, in a prior art product, comprise dual hydraulic cylinders with custom orifices which prevent compression and in turn prevent rotation of the attenuator during impact. The two outboard supports must be disconnected from the attachment pins when the attenuator is in transit. Then, upon arrival at the job site, the operator must manually attach both outboard hydraulic supports to their connection points in the backing plate. This process is complex and labor-intensive, and requires the installation of a non-factory steel plate and brackets for the cylinder pins which must be installed by the customer. Maintenance is required on a regular basis to assure that the hydraulic fluid reservoir is filled to the proper level at all times.

SUMMARY OF THE INVENTION

The present invention advantageously combines the uni-connection with the tri-connection support to prevent the attenuator from rotating during an impact event. The system prevents rotation of the trailer-mounted crash attenuator relative to the host vehicle, upon impact by an errant vehicle, but does not require complex and labor intensive installation of special equipment on the host vehicle, or continual maintenance of a hydraulic system.

More particularly, there is provided a crash impact attenuator for attachment to a host vehicle, which comprises an attachment system having an internal support tube and a plurality of external support tubes. The internal support tube has a connector on a front end thereof for attachment to a suitable receptacle on the host vehicle, and the plurality of external support tubes each have an anti-rotation support pad on a front end thereof. At least one of the internal support tube and the plurality of external support tubes is comprised of a telescoping construction. A backup frame is disposed on a rear end of the attachment system, and a crash attenuator unit is disposed on an axle and pair of wheels for mobility.

In one embodiment, the internal support tube is comprised of a telescoping construction, comprising an internal fixed tube and an external telescoping tube.

A stop plate is disposed on a rearward end of the internal support tube. A shear pin is disposed in the internal support tube, which is adapted to break upon impact on the crash impact attenuator by an errant vehicle. When the shear pin breaks, the internal support tube is released to telescope to a collapsed orientation, so that the external support tubes move forwardly to engage a stop plate on the host vehicle.

Advantageously, the internal support tube extends forwardly of the external support tubes, so that, when the attachment system is engaged with a host vehicle, during normal conditions, there is a gap between the anti-rotation support pad on each external support tube and said host vehicle. This gap permits the trailer to rotate relative to the host vehicle during normal driving conditions, for turns and the like.

A friction lock is provided for locking the attachment system in an anti-lock orientation upon impact by an errant vehicle with the crash impact attenuator, so that it is not disengaged until disengagement is desired by the work crew or emergency personnel after impact.

In a second modified embodiment, the external support tubes are each comprised of a telescoping construction, and the internal support tube is of a fixed length. In this embodiment, the internal support tube comprises a center support tongue.

The crash attenuator unit comprises a frame and an energy absorbent cartridge. The wheels and axle unit are disposed at a longitudinal midpoint of the crash attenuator unit, in one embodiment, and at a rearward end of the crash attenuator unit in a modified embodiment.

In another modified embodiment, an arrowboard unit is attachable to the crash impact attenuator. The arrowboard unit comprises an arrowboard disposed on a plurality of support posts, which support posts are mountable on the backup frame.

In another aspect of the invention, there is provided an attachment system for attaching a trailer-mounted crash impact attenuator to a host vehicle, which comprises an internal support tube and a plurality of external support tubes. The internal support tube has a connector on a front end thereof for attachment to a suitable receptacle on the host vehicle, and the plurality of external support tubes each have an anti-rotation support pad on a front end thereof. At least one of the internal support tube and the plurality of external support tubes is comprised of a telescoping construction.

In one embodiment, the internal support tube is comprised of a telescoping construction, comprising an internal fixed tube and an external telescoping tube.

A stop plate is disposed on a rearward end of the internal support tube. A shear pin is disposed in the internal support tube, which is adapted to break upon impact on the crash impact attenuator by an errant vehicle. When the shear pin breaks, the internal support tube is released to telescope to a collapsed orientation, so that the external support tubes move forwardly to engage a stop plate on the host vehicle.

Advantageously, the internal support tube extends forwardly of the external support tubes, so that, when the attachment system is engaged with a host vehicle, during normal conditions, there is a gap between the anti-rotation support pad on each external support tube and said host vehicle. This gap permits the trailer to rotate relative to the host vehicle during normal driving conditions, for turns and the like.

A friction lock is provided for locking the attachment system in an anti-lock orientation upon impact by an errant vehicle with the crash impact attenuator, so that it is not disengaged until disengagement is desired by the work crew or emergency personnel after impact.

In a second modified embodiment, the external support tubes are each comprised of a telescoping construction, and the internal support tube is of a fixed length. In this embodiment, the internal support tube comprises a center support tongue.

The invention, together with additional features and advantages thereof, may best be understood by reference to the following description taken in conjunction with the accompanying illustrative drawing.

BRIEF DESCRIPTION OF THE DRAWINGS

FIG. 13 is a perspective view illustrating a modified embodiment of a trailer crash attenuator in accordance with the present invention, attached to a host truck;

FIG. 14 is an exploded view of the embodiment of FIG. 13;

FIG. 15 is a perspective view of the trailer crash attenuator of FIG. 13, unattached to a host vehicle.

DESCRIPTION OF THE PREFERRED EMBODIMENTS

Figure 1:
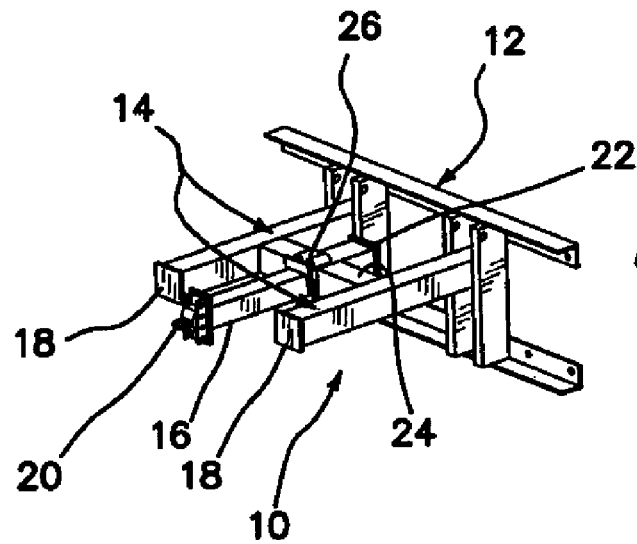
FIG. 1 is a perspective view of an embodiment of a trailer attenuator attachment system constructed in accordance with the principles of the present invention.

Referring now to the figures, wherein like reference numerals refer to like elements throughout the figures, there is shown in FIG. 1 a telescoping anti-rotation attachment system 10 constructed in accordance with the principles of the present invention. The system 10 comprises a backup frame 12, a pair of external anti-rotation support tubes 14, and an internal telescoping support tube 16.

Anti-rotation support pads 18 are disposed on the distal end of each of the external anti-rotation support tubes 14, and an adjustable eye assembly 20 is disposed on the distal end of the internal telescoping support tube 16.

The trailer attachment system 10, in a preferred embodiment, is made of A-36 steel and weights approximately 660 lbs. The overall dimensions are approximately 25 in.×54 3/16 in.×74 in. During normal operation, the system 10 attaches to a pintle hook on a truck, using the eye assembly 20, which in one embodiment comprises a 3 in. lunette eye. This eye is a standard component for trailers where the truck pintle hook is connected for attenuator transport. This eyelet should be a 20,000 lb. minimum standard trailer eyelet.

Again, referring to a preferred embodiment, the telescoping tube 16 is preferably ½ in.×5 in.×5 in. for an internal fixed tube 16a and ½ in.×6 in.×6 in. for an external telescoping tube 16b. The external support tubes 18 are also preferably ½ in.×6 in.×6 in. The anti-rotation support pads 18 preferably comprise A-36 steel plate, preferably ½ in. thick. In the embodiment illustrated in FIG. 1, the pad size is approximately 6 in.×6 in., but it is preferably preferred that the pads 18 be larger, as shown, for example in FIGS. 11 and 12. The two external support tubes 14 are substantially shorter than the internal telescoping tube 16, as shown in FIG. 1, so that the vehicle, when traveling, can freely negotiate a complete 90 degree turn if necessary.

Of course, while presently preferred materials and dimensions have been disclosed herein, for the purpose of thoroughness and to ensure an enabling disclosure, those of ordinary skill in the art will recognize that alternative materials and dimensions may be selected, depending upon desired application and performance criteria, without departing from the basic principles of the invention.

Figure 2:
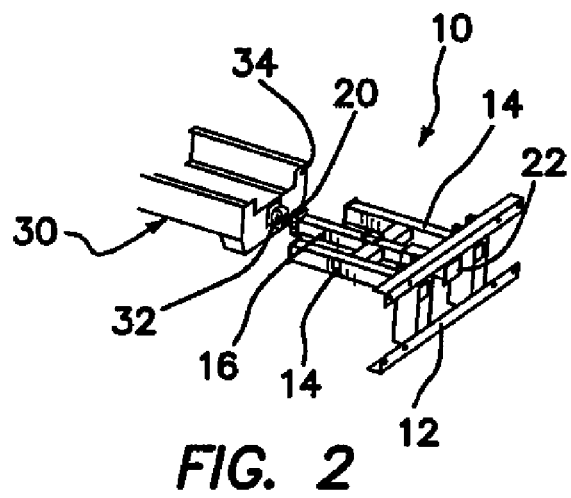
FIG. 2 is a perspective view showing the trailer attenuator attachment system of FIG. 1 engaged to a truck prior to impact by an errant vehicle.
Figure 3:
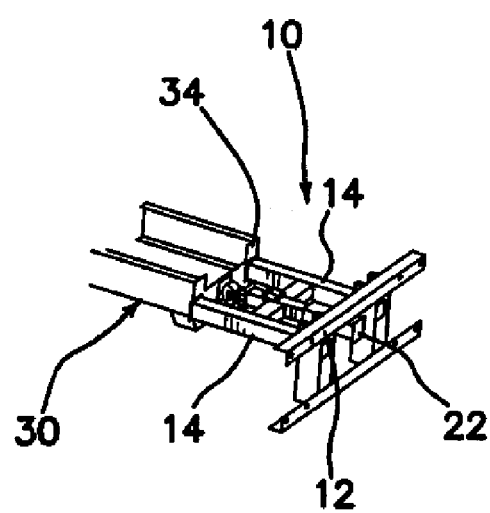
FIG. 3 is a perspective view similar to FIG. 2, showing the system after impact by an errant vehicle.
Figure 4:
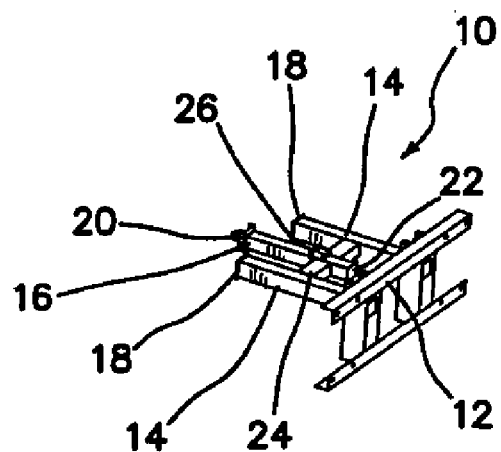
FIG. 4 is a perspective view of the system of FIG. 1, from a different viewpoint.
Figure 5:
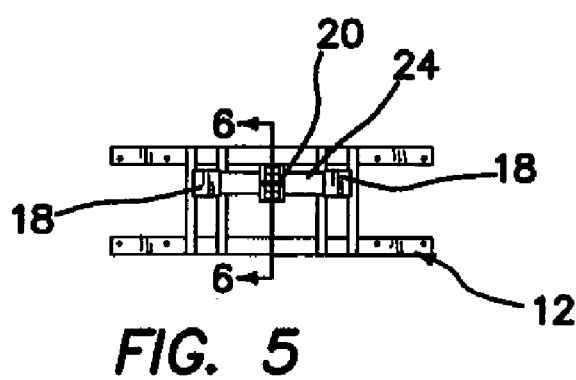
FIG. 5 is a plan view from the front end of the system.
Figure 6:
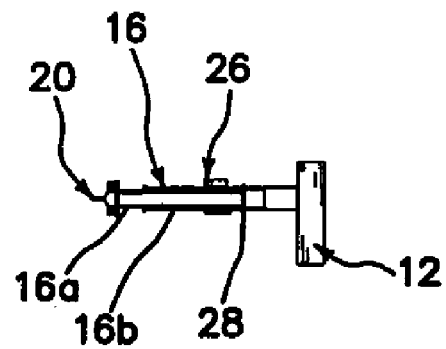
FIG. 6 is a cross-sectional view taken along lines 6-6 of FIG. 5.
Figure 7:
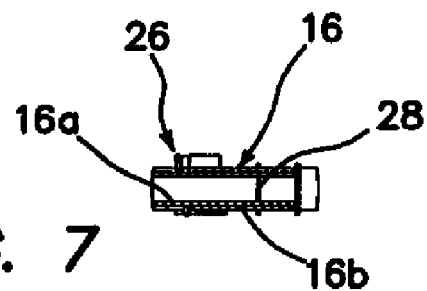
FIG. 7 is a detail view of a portion of FIG. 6.

With respect now to FIGS. 1-7, more details of the system 10 and its engagement with a truck or other suitable vehicle will become apparent. As shown in FIG. 4, on the rear end of the internal telescoping tube 16 is installed a stop plate 22, which closes the end of the tube 16. This plate acts as a stop when the trailer attenuator is being towed. When the tow vehicle is pulling the trailer attenuator, the plate 22 is larger than the outside dimension of the external telescoping tube 16b. The stop plate 22 and the pintle hook of the tow vehicle share the load during transport of the trailer attenuator.

As shown in FIGS. 4-7, a cross-bar 24 is disposed across the system 10, extending through the internal tube 16 and connecting the two external tubes 14. A spring-loaded friction brake or lock 26 is disposed on the internal tube 16, wherein the cross-bar intersects the internal tube 16. A shear pin 28 is disposed in the internal fixed tube 16a and the external telescoping tube 16b of the internal tube 16, and is arranged to slide down vertically between both tubes. During normal operational use, with the system 10 connected to a truck frame 30, by attachment of the eye hook 20 to a pintle hook 32 on the truck frame 30, the shear pin 28 is not under load. Loads during operation are distributed between the pintle hook and a stop plate 34 on the truck. This condition, prior to impact, is illustrated particularly in FIG. 2. However, during an impact, the shear pin 28 undergoes double shear. Once the pin has sheared, as shown in FIG. 3, the system 10 slides forwardly against the plate 34 on the truck. The anti-rotation arms 14 slide forwardly, and the anti-rotation support pads 18 on those arms 14 bump up against the truck plate 34, thus preventing the attenuator from rotation around the end of the truck. At the point at which the system 10 bumps up against the truck plate, the system is converted from a uni-attachment to a tri-support system, with two outward support arms 14 preventing angular rotation and the central pintle hook attachment providing direct central support.

To reduce rotation of the attenuator in angled impact situations, the telescoping anti-rotation attachment system 10 has an anti-rotation locking mechanism. The anti-rotation locking mechanism is a one-direction friction lock 26 incorporated into the internal and external telescoping tubes 16a and 16b, respectively. In an impact of sufficient force to shear the shear pin 28, the inner support tube 16 is released to telescope to a collapsed orientation, so that the system 10 is allowed to slide up to the truck frame unrestricted, as shown in FIG. 3. The anti-rotation locking system then restricts the system 10 from moving away from the truck frame 30.

In normal operation of the trailer, the anti-rotation lock is set in the ready position. The anti-rotation locking mechanism has no effect during normal operation of the trailer. In a direct impact, the anti-rotation lock provides no restriction to the system 10 sliding forward, allowing the anti-rotation arms 14 to contact the truck plate 34. When the anti-rotation arms 14 have contacted the truck plate 34, the locking mechanism 26 holds the system 10 in plate against the plate 34. During an angled impact, when the system 10 slides forwardly, the anti-rotation arms 14 contact the frame 30. The direction of the impact creates an angular moment, putting one of the anti-rotation arms 14 in compression and one in tension. The locking action restricts the rotation of the attenuator by placing the pintle hook attachment in tension. With the pintle hook attachment in tension, and one of the anti-rotation arms in compression, rotation of the attenuator is restricted. Post impact, the lock can be easily released, allowing the system 10 to be moved back from the end structure of the truck.

Figure 8:
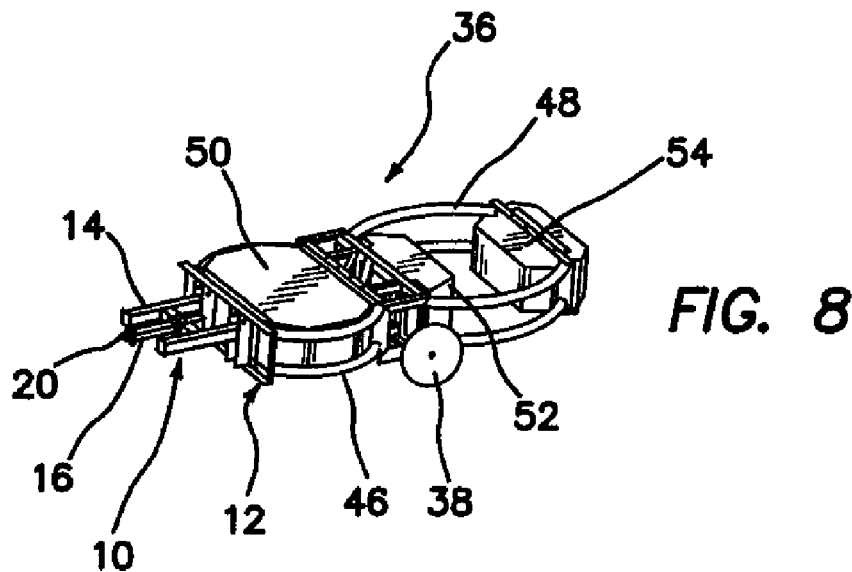
FIG. 8 is a perspective view of a trailer mounted crash attenuator according to the principles of the present invention.
Figure 9:
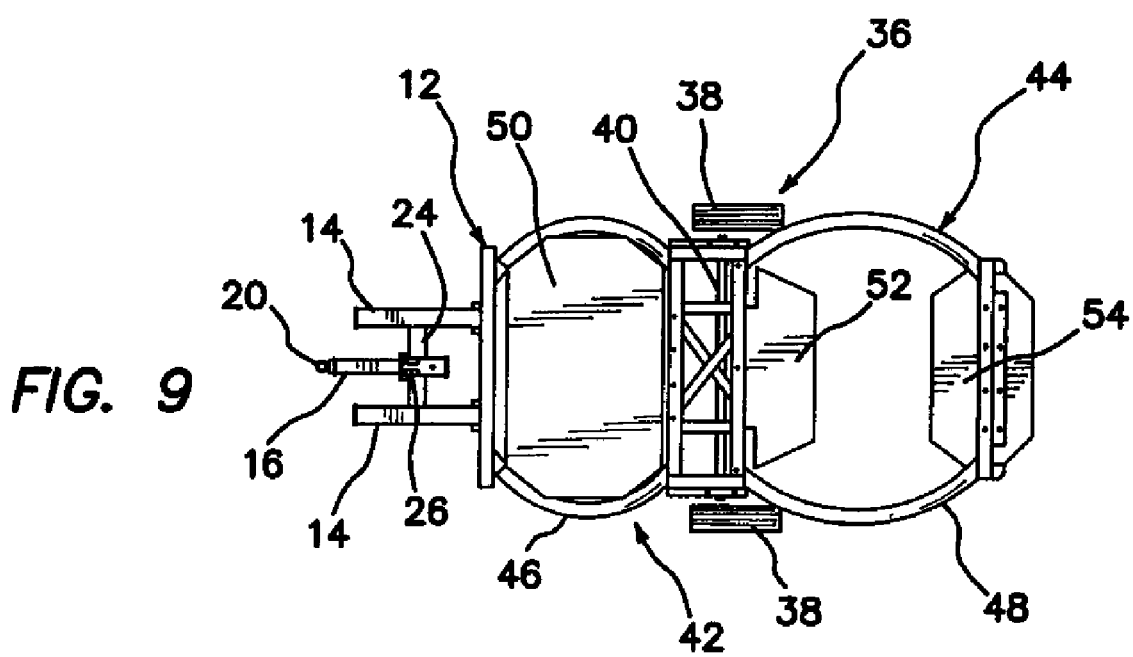
FIG. 9 is a top view of the crash attenuator of FIG. 8.
Figure 10:
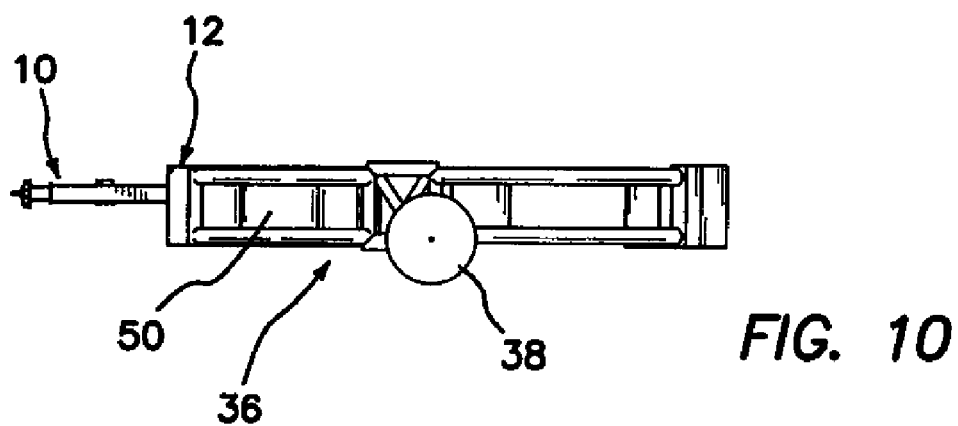
FIG. 10 is a side view of the crash attenuator of FIGS. 8 and 9.

Now with reference to FIGS. 8-10, a crash attenuator unit 36 has been attached to the telescoping anti-rotation attachment system 10. The unit 36 is attached to the backup frame 12 in known fashion. In the illustrated embodiment, the attenuator unit 36 is mounted on wheels 38 disposed on a standard axle assembly 40, as shown. In preferred embodiments, the crash attenuator unit 36 is essentially the same as an existing SCORPION TMA available from the assignee TrafFix Devices, Inc. and shown and described in U.S. Pat. No. 6,581,992, already incorporated herein by reference. Components of the crash attenuator unit 36 include a strut portion 42 and a cartridge portion 44. The strut portion 42 comprises a frame 46, preferably comprised of aluminum tubing, and the cartridge portion 44 comprises a frame 48, also comprised of aluminum tubing. Energy absorbent cartridges 50, 52, and 54 are disposed within the unit 36.

Figure 11:
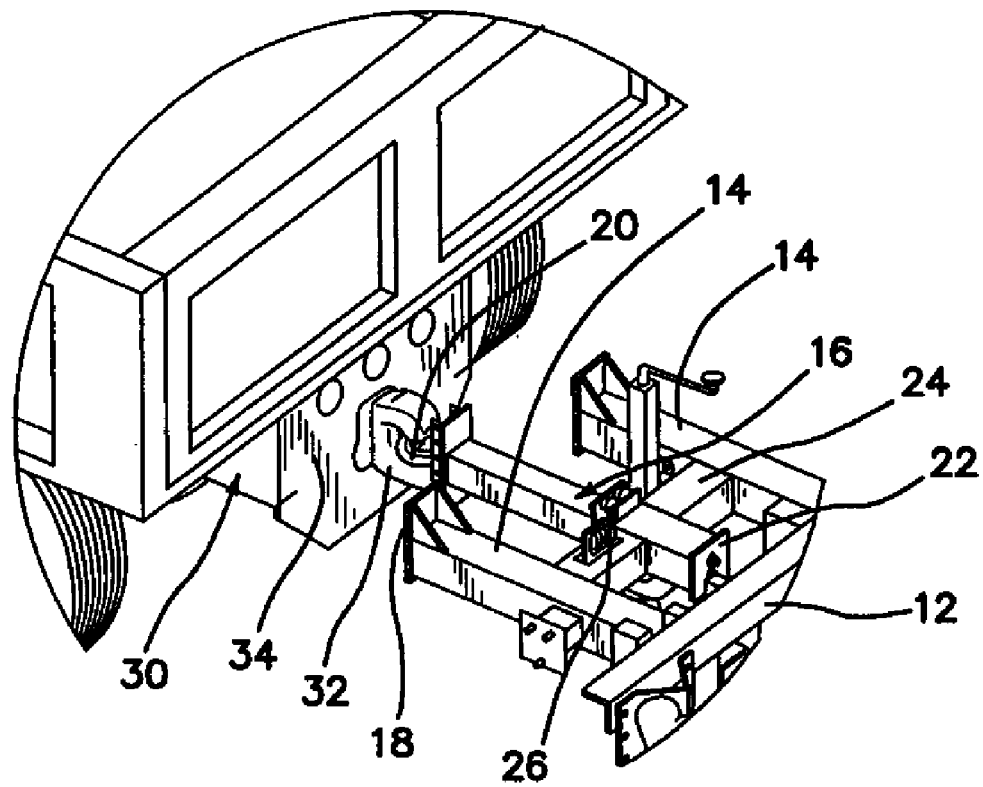
FIG. 11 is a perspective view illustrating the telescoping anti-rotation attachment system according to the present invention, attached to a host truck, prior to impact by an errant vehicle.
Figure 12:
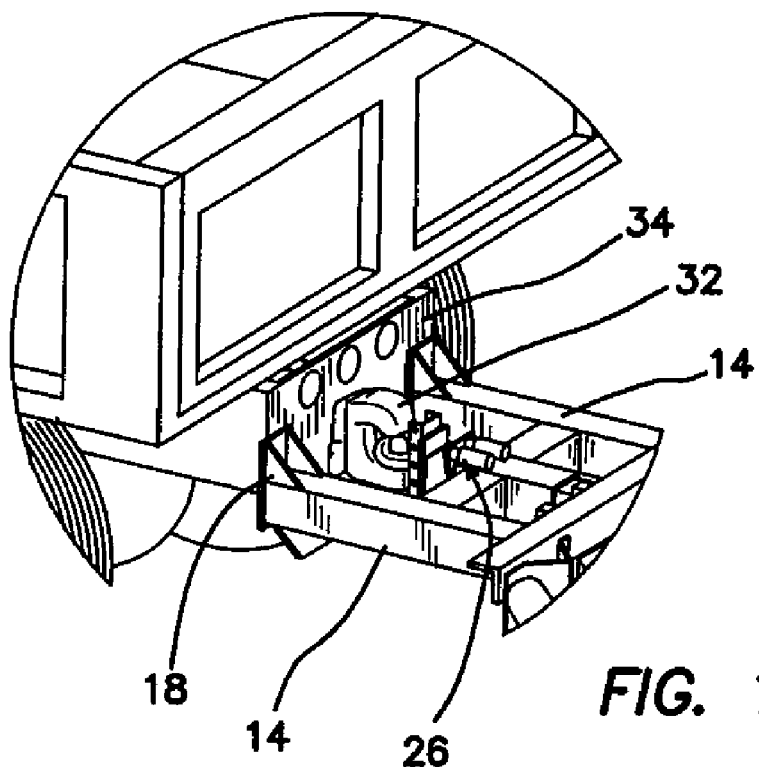
FIG. 12 is a perspective view similar to FIG. 11, after the crash attenuator has been impacted by an errant vehicle.

FIGS. 11 and 12 are somewhat similar to FIGS. 2 and 3, in that they illustrate a pre-impact condition position for the inventive system 10, in FIG. 11, and a post-impact condition position for the inventive system, in FIG. 12, in somewhat more detail than is shown in FIGS. 2 and 3. In particular, in this embodiment, larger anti-rotation support pads 18 are shown than in the FIGS. 2 and 3 embodiment, which provides a better support contact between the system 10 and the stop plate 34.

FIGS. 13-15 illustrate a somewhat modified embodiment of the present invention, wherein an arrowboard 56 has been installed on the crash attenuator unit 36, specifically on the backup frame 12. The arrowboard unit 56 includes support posts 58 which engage the back up frame to mount the arrowboard 56 onto the crash attenuator. This embodiment is also different, in that the wheels 38 and axle assembly 40 are disposed in the rear of the unit 36, rather than the center thereof. This embodiment offers some advantages, in that it makes the unit simpler, lighter, more stable, and easier to produce.

Figure 16:
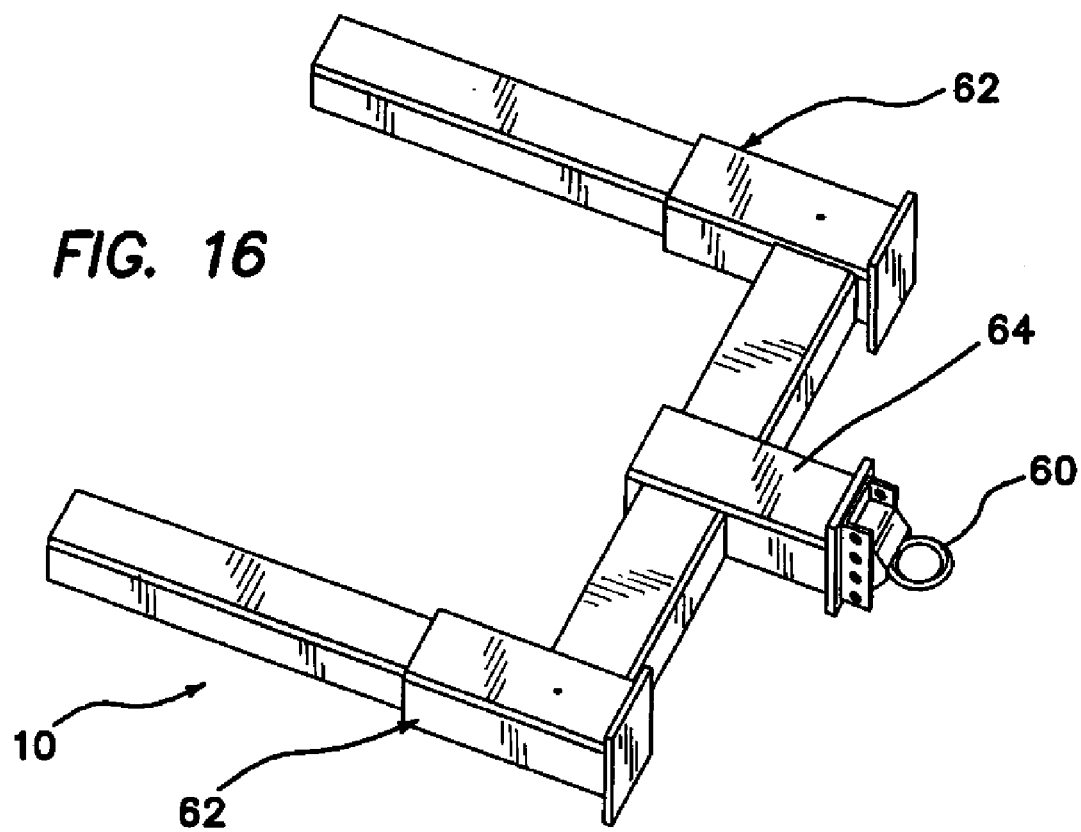
FIG. 16 is a perspective view of a modified embodiment of a telescoping anti-rotation attachment system constructed in accordance with the principles of the present invention.

Still another modified embodiment, of the telescoping anti-rotation attachment system 10, is illustrated in FIG. 16. This embodiment features a single point attachment between the TMA and the host vehicle, as in previous embodiments, by means of a ring hook 60 or the like, suitable for attachment using a conventional hitch system or other desired means. Aft of the ring hook 60 are a plurality of telescoping sliders 62, which function to collapse upon vehicular impact with the TMA, in order to prevent rotation of the trailer (TMA) upon impact. This embodiment differs from that shown in the prior embodiments, for example, in that the center support tongue 64 for supporting the ring 60 is rigid, rather than telescoping, as in the prior embodiment. On the other hand, the two supports 62 are telescoping, rather than rigid, as in the prior embodiment. The important concept is that, in either embodiment, there is a single-point connection between the TMA and the vehicle, in conjunction with structure to prevent rotation of the TMA upon impact by a vehicle. Within this parameter, the structure may include one or more slides, one or more telescoping tubes, and/or one or more collapsing tubes, used in conjunction with one or more stops that move into contact with the host vehicle, in order to resist rotation of the trailer attenuator.

Some of the advantages of the present invention, and, particularly, these additional embodiments, are that it can be used in connection with a lighter host vehicle than the federal standard 19,600 lb. host vehicle currently necessary for TMA's. The inventors have determined that the present invention may successfully be used with a host vehicle as light as 10,000 lb, and perhaps lighter. The rams prevent rotation of the trailer with respect to the host vehicle. A torsion axle is preferably employed instead of leaf springs. The embodiments with rear-mounted wheels allow for elimination of a relatively incompressible center axle Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A crash impact attenuator for attachment to a host vehicle, comprising:
    an attachment system having an internal support tube and a plurality of external support tubes, the internal support tube having a connector on a front end thereof for attachment to a receptacle on the host vehicle and the plurality of external support tubes each having an anti-rotation support pad on a front end thereof, wherein the internal support tube is comprised of a telescoping construction, having an internal fixed tube and an external telescoping tube;
    a backup frame disposed on a rear end of said attachment system;
    a crash attenuator unit, said crash attenuator unit being disposed on an axle and pair of wheels for mobility; and
    a shear pin disposed in said internal support tube, said shear pin being adapted to break upon impact on the crash impact attenuator by an errant vehicle, thus releasing the internal support tube to telescope to a collapsed orientation, so that the external support tubes move forwardly to engage a stop plate on the host vehicle.

2. The crash impact attenuator as recited in claim 1, and further comprising a stop plate disposed on a rearward end of the internal support tube.

3. The crash impact attenuator as recited in claim 1, wherein the internal support tube extends forwardly of the external support tubes, so that, when the attachment system is engaged with a host vehicle, during normal conditions, there is a gap between the anti-rotation support pad on each external support tube and said host vehicle.

4. The crash impact attenuator as recited in claim 1, wherein said crash attenuator unit comprises a frame and an energy absorbent cartridge.

5. The crash impact attenuator as recited in claim 1, wherein said wheels and axle unit are disposed at a longitudinal midpoint of said crash attenuator unit.

6. The crash impact attenuator as recited in claim 1, wherein said wheel and axle unit are disposed at a rearward end of said crash attenuator unit.

7. The crash impact attenuator as recited in claim 1, and further comprising an arrowboard unit attachable to said crash impact attenuator.

8. The crash impact attenuator as recited in claim 7, wherein said arrowboard unit comprises an arrowboard disposed on a plurality of support posts, said support posts being mountable on said backup frame.

9. An attachment system for attaching a trailer-mounted crash impact attenuator to a host vehicle, comprising an internal support tube and a plurality of external support tubes, the internal support tube having a connector on a front end thereof for attachment to a receptacle on the host vehicle, and the plurality of external support tubes each having an anti-rotation support pad on a front end thereof, wherein the internal support tube is comprised of a telescoping construction, having an internal fixed tube and an external telescoping tube, said system further comprising a shear pin disposed in said internal support tube, said shear pin being adapted to break upon impact on the crash impact attenuator by an errant vehicle, thus releasing the internal support tube to telescope to a collapsed orientation, so that the external support tubes move forwardly to engage a stop plate on the host vehicle.

10. The crash impact attenuator as recited in claim 9, and further comprising a stop plate disposed on a rearward end of the internal support tube.

11. The crash impact attenuator as recited in claim 9, wherein the internal support tube extends forwardly of the external support tubes, so that, when the attachment system is engaged with a host vehicle, during normal conditions, there is a gap between the anti-rotation support pad on each external support tube and said host vehicle.

* * * * *